No. 734,490. PATENTED JULY 21, 1903.
W. O. WORTH.
UNIVERSAL JOINT OR SHAFT COUPLING.
APPLICATION FILED MAY 2, 1901.
NO MODEL.

Witnesses:
Ray White
Harry C. Alute

Inventor:
William O. Worth
By Toree Bain Attorney

No. 734,490. Patented July 21, 1903.

UNITED STATES PATENT OFFICE.

WILLIAM O. WORTH, OF CHICAGO, ILLINOIS, ASSIGNOR, BY DIRECT AND MESNE ASSIGNMENTS, TO HIMSELF, AND WILLIAM R. DONALDSON, OF LOUISVILLE, KENTUCKY.

UNIVERSAL JOINT OR SHAFT-COUPLING.

SPECIFICATION forming part of Letters Patent No. 734,490, dated July 21, 1903.

Application filed May 2, 1901. Serial No. 58,503. (No model.)

*To all whom it may concern:*

Be it known that I, WILLIAM O. WORTH, a citizen of the United States, residing at Chicago, county of Cook, and State of Illinois, have invented certain new and useful Improvements in Universal Joints or Shaft-Couplings; and I do hereby declare the following to be a full, clear, and exact description of the invention, such as will enable persons skilled in the art to which it appertains to make and use the same.

My invention relates to improvements in universal joints or shaft-couplings.

The object of my invention is to provide a universal joint in which all of the bearing-surfaces are housed in a dust and water tight casing.

Another object of my invention is to provide a means by which all of the bearings of the said joints will be automatically lubricated.

Figure 1:
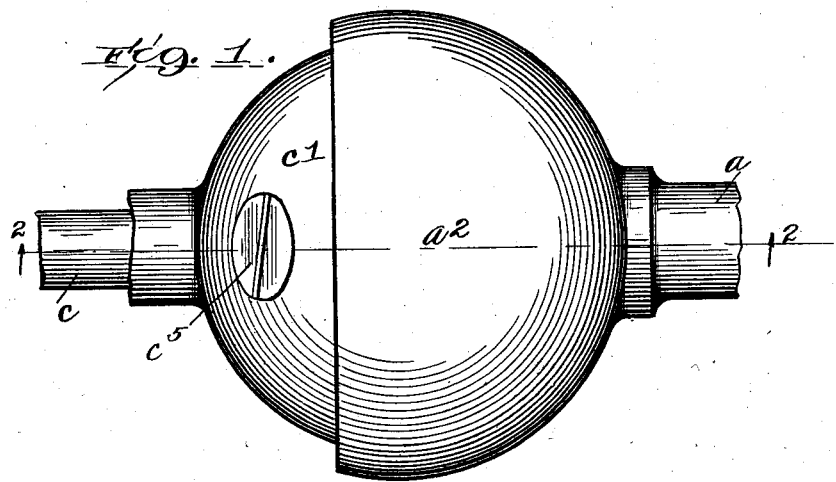
Figure 2:
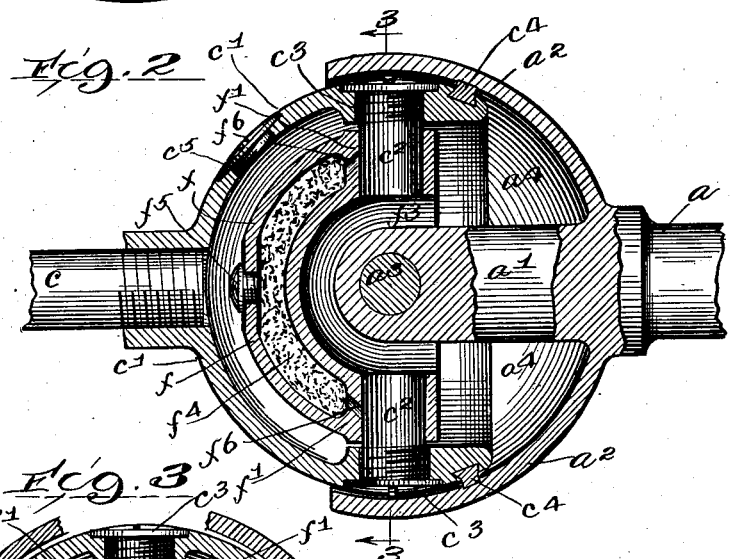
Figure 3:
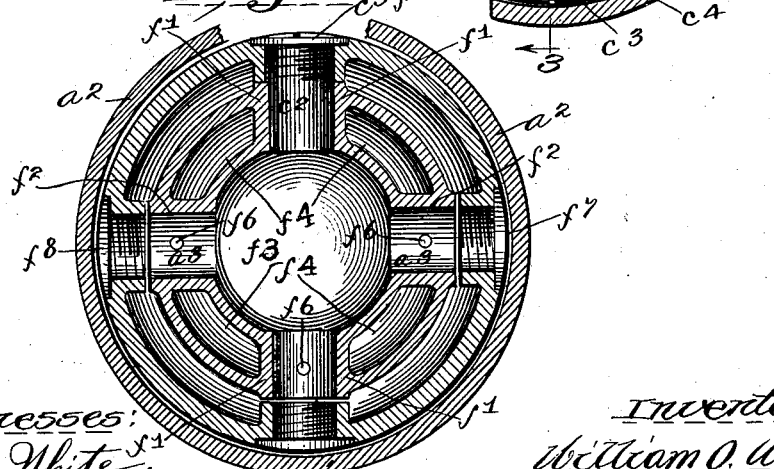

In the drawings, Figure 1 is an elevation of my universal joint or shaft-coupling. Fig. 2 is a section through line 2 2 of Fig. 1. Fig. 3 is a section through line 3 3 of Fig. 2.

In all of the views the same letters of reference indicate similar parts.

The joint consists, essentially, of three principal members $a$, $c$, and $f$.

$a'$ is a central inner projection carrying a pintle $a^3$.

$a^2$ is a spheriform hood, preferably made integral with the parts $a$ and $a'$.

$c$ is a shaft provided with a cup-shaped spheriform part, carrying bearings for the pintles of both of the other members.

$c^2$ $c^2$ are bearing-pins on opposite diameters of the latter cup-shaped portion, which are preferably screwed into bearings $c^3$, that are carried thereby, the heads coming flush with the outer circumference of the said cup-shaped portion. These pins are made tight in this portion and pass loosely through bearing-surfaces made in the third or intermediate member. The bearing-pintle $a^3$ and the bearing-pins $c^2$ are both loosely carried in corresponding opposite bearings in the cup-shaped or intermediate member and arranged in a common plane.

$c^4$ is an annular packing, preferably made of rubber, leather, or like material, which is carried in a groove made into the piece $c'$ and is in intimate contact with the inner surface of the hood-shaped covering $a^2$.

$f'$ $f'$ are bearings in the member $f$ for the pin $c^2$, and $f^2$ the bearings in the same piece for the single pintle $a^3$.

$f^3$ is a depression or recess in the cup $f$, surrounded by an annular wall, arranged to receive the pivoted or hinged portions of the element $a$.

The projection $a'$ extends into the annulus formed by the bearing member, and the pintle $a^3$, perpendicular to the projection $a'$, is disposed coaxially with a diametrical axis of the annulus.

$f^4$ represents receptacles made on the interior of the cup $f$ for containing lubricating-oil or hard grease used for the purpose of lubricating the respective bearings $a^3$ and $c^2$ through properly-constructed channels $f^6$, as shown.

$f^5$ is a screw which covers an opening in the cup $f$, which is made therein for the purpose of admitting the lubricating material, the screw being used for the purpose of retaining the said material in the said receptacles.

$c^5$ is an opening through which the screw $f^5$ is accessible. It is also closed by a similar screw or cap.

$f^7$ and $f^8$ are cap-screws for covering the openings made into the element $c'$ for the purpose of admitting the pintle-pin $a^3$ when the device is being assembled.

It will be noticed that the pintle $a^3$ joins the part $a'$ to the cup-shaped interior portion $f$. The pintle does not extend to the portion $c$. It will also be noticed that the portion $f$ is joined to the portion $c$ by means of the bearing-pins $c^2$ $c^2$.

The use and operation of a knuckle-joint is so well known to those skilled in the art that it does not seem necessary to describe its operation, the object of my device being to construct a joint of this character in which the bearings will be at all times perfectly lubricated and protected from dust and moisture and other deleterious influences.

The packing $c^4$ will seal the casing and prevent such agencies from entering the receptacle $a^4$, in which the bearing portions are contained.

The lubricating material contained within the receptacle $f^4$ is so arranged that it will be automatically supplied to the bearing pins and pintle in the manner described.

The entire receptacle contained between the hoods $a^2$ and $c'$ may be filled with lubricating material for this purpose. In this event it is also evident that the packing $c^4$ should be made of metal, which may be held out into contact with the hood portion $x^2$ of the casing by means of a spring in a manner similar to packing or bull rings usually placed on the piston of steam-engines.

I have shown in the drawings the simplest method of making the packing; but I do not wish to be confined to that form alone.

Having described my invention, what I claim as new, and desire to secure by Letters Patent of the United States, is—

In a universal shaft-coupling, the combination with two shaft members, of a casing formed of two sections carried by the respective shaft members, a cup-shaped bearing member arranged within the casing, a projection from one of said shaft members arranged to extend into the interior of the bearing member, a pintle secured to the projection and loosely journaled in the bearing member, removable pintles mounted on the casing-section carried by the opposing shaft member and loosely journaled in the bearing member, there being an oil-chamber formed in the bearing member and extended uninterruptedly throughout the same, and oil-ducts communicating with said chamber and with the journals of the pintles.

In testimony whereof I have signed this specification, in the presence of two subscribing witnesses, this 22d day of April, A. D. 1901.

WILLIAM O. WORTH.

Witnesses:
ARTHUR B. CRANE,
FORÉE BAIN.